United States Patent

[11] 3,628,004

[72] Inventors William E. Claxton
Mogadore;
Harold C. Holden, Manchester, both of Ohio
[21] Appl. No. 840,622
[22] Filed July 10, 1969
[45] Patented Dec. 14, 1971
[73] Assignee The Firestone Tire & Rubber Company
Akron, Ohio

[54] COMPUTER OPTIMIZER
23 Claims, 9 Drawing Figs.

[52] U.S. Cl............................................... 235/193,
235/180, 235/184, 235/194
[51] Int. Cl....................................................... G06g 7/16,
G06g 7/36, G06g 7/48
[50] Field of Search........................................ 235/193–197,
151.35, 180, 183, 184

[56] References Cited
UNITED STATES PATENTS

| | | | |
|---|---|---|---|
| 3,281,584 | 10/1966 | Martinez..................... | 235/193 X |
| 3,457,394 | 7/1969 | Grado........................ | 235/197 X |
| 3,505,512 | 4/1970 | Fricke, Jr. et al........... | 235/180 X |
| 3,513,246 | 5/1970 | Fisch et al.................. | 235/193 X |

*Primary Examiner*—Malcolm A. Morrison
*Assistant Examiner*—Jerry Smith
*Attorneys*—S. M. Clark and Willard L. G. Pollard ABSTRACT: A special purpose analog computer designed for optimization of the ingredient levels of a chemical compound. The physical characteristics of a particular rubber blend may be closely approximated by a general empirical or mathematical model equation expressed in first and second order terms of the ingredients. By analysis of raw experimental data relating to the physical characteristics of interest, a different set of influence coefficients for the general equation terms may be determined for each physical characteristic, whereby a number of special model equations are obtained. In the preferred embodiment of the invention an eight-channel analog system is provided for simultaneously evaluating eight special model equations, expressed in terms of five ingredients. The set of influence coefficients for the terms of each special model equation are scaled to values less than unity and are dialed upon a separate bank of potentiometers of the analog computer. Five variable factor dials are provided to control the voltage level or desired value of the ingredients which may be altered to simulate various combinations of ingredients. The analog computer then instantly computes eight outputs which represent the response values of the eight physical characteristics for the selected blend of ingredients. A four-oscilloscope readout is provided utilizing the eight outputs and is programmed so that an ideal blend results in the convergence of the four oscilloscope beams toward the center of the readout array. The computer has an automatic search mode of operation to continuously vary the levels of the variable factors to automatically search through a range of factor levels to attempt to locate that combination of blend of ingredients which produces the best response. Also a combination search is provided wherein the variable factor levels are periodically changed only in the direction to achieve optimum results and thus the optimum blend of constituents may be determined by this combination search circuit. The foregoing abstract is merely a resume of one general application, is not a complete discussion of all principles of operation or applications, and is not to be construed as a limitation on the scope of the claimed subject matter.

INVENTORS
WILLIAM E. CLAXTON
HAROLD C. HOLDEN

INVENTOR.
WILLIAM E. CLAXTON
HAROLD C. HOLDEN

INVENTORS
WILLIAM E. CLAXTON
HAROLD C. HOLDEN

INVENTOR.
WILLIAM E. CLAXTON
HAROLD C. HOLDEN

INVENTORS
WILLIAM E. CLAXTON
HAROLD C. HOLDEN

INVENTORS.
WILLIAM E. CLAXTON
HAROLD C. HOLDEN

COMPUTER OPTIMIZER

CROSS-REFERENCE TO RELATED APPLICATION

This is an improvement of our application Ser. No. 729,601 filed May 16, 1968, for a Blend Optimizer, now U.S. Pat. No. 3,560,725, issued Feb. 2, 1971.

BACKGROUND OF THE INVENTION

The present invention relates to a special purpose analog computer for use in design investigations involving variable factor systems. Within the chemical industry and rubber industry in particular, such plural factor design investigations have been performed at least in the areas of compounding, textiles, polymerization, and tire wear and noise analysis.

Particularly in the design of rubber compounds great difficulty has been encountered in the speedy determination of optimum ingredient blends, capable of yielding suitable physical characteristics while yielding minimum cost and production time factors. Some compounding problems arise directly from the relatively large number of ingredients in the typical blend and/or from the high criticality of the ingredients. Thus many service compounds now contain seven, eight or even a larger number of basic ingredients. Slight variations in the levels of some of the ingredients may evoke drastic changes in the physical characteristics of the rubber product or in the cost and time factors involved in its production.

Other perhaps more severe difficulties in designing or analyzing a rubber blend arise from interactions between the various ingredients. Thus, the final effect upon the physical characteristics of a blend caused by a variation in the level of one ingredient may in turn depend upon the level of a second ingredient contained in the blend. Clearly any analysis of data relating to test results of compounding experiments is greatly complicated by such interaction effects.

Older methods for designing rubber compounds attempted to overcome the above problems through the use of a large number of experiments. Thus, a rubber blend under study was repeatedly compounded and tested, with the level of only one ingredient being changed at a time. The increments of change were made small and the changes in the ingredient were plotted against the results of test measurements on the physical characteristics or responses of interest. If a large number of experiments were performed and sufficient data accumulated and analyzed, a near optimum compound design could be determined. However, the obvious time involvement and inefficiency of such methods caused the compounder to attempt other approaches, which led to the development of the present invention.

Problems similar to those outlined above have generally plagued the designer studying other plural variable systems within the rubber industry, as well as in the other industries as diverse as agriculture and petroleum. Consequently design studies performed in these areas are also susceptible of solution by using the invention described herein.

The invention may be incorporated in an analog computer comprising, in combination, a voltage source, function generator means connected to said voltage source to establish a first output voltage variable at a predetermined rate, means for multiplying said first output voltage of said function generator means by a first predetermined value to produce a second output voltage proportional to the product of said first output voltage and said first value, summing amplifier means, and means connecting said second output voltage to said summing amplifier means to establish an amplified output.

SUMMARY OF THE INVENTION

The present invention relates to a special purpose analog computer designed for the evaluation of statistically designed experiments which have become increasingly popular as an aid to optimization in the rubber industry as well as in other technical areas. The basic techniques utilized in carrying out designed experiments depend upon setting up special mathematical model equations which will closely approximate the behavior of the responses of interest in terms of the factors under study. With respect to rubber compounding it should be apparent that the factors under study would be the ingredients in the blend; while the responses of interest would be physical characteristics such as ultimate elongation, modulus, running temperature, percent steel ball rebound, ring tearing resistance and chipping severity, or production characteristics relating to cost and production time.

It has been determined that all the physical properties of a rubber blend may be closely approximated by a general empirical model equation of second-order terms. Such an equation of the physical property or response $Y_A$ in terms of two ingredients or variable factors $x_1, X_2$ would take the form $$Y_A = a_o + a_1 + a + a_{11}x_1^2 + a_{22}x_2^2 + a_{12}x_1x_2 \quad (1)$$

where $a_o, a_1, a_2, a_{11}, a_{22}$ and $a_{12}$ represent influence coefficients which are unique and constant for the response $Y_A$.

It is possible to establish the numerical values of the influence coefficients by known techniques, for example, by the analysis of raw data relating to the physical characteristic $Y_A$ measured for various values of $x_1$ and $x_2$, utilizing a general purpose digital computer or a desk calculator. Once the influence coefficients have been determined, use of the special purpose analog computer of the present invention enables the solution of the special model equation (1) to instantly evaluate $Y_A$ for any desired values of $x_1$ and $x_2$.

The analog computer of the present invention generally comprises an assembly of function generators or variable factor level generators which receive reference voltages as inputs and are interconnected with an array of influence coefficient potentiometers to develop a plurality of proportional output currents corresponding, respectively, to the terms of the special model equation. These individual currents are collected by switching circuits on positive and negative buses and summed by a pair of amplifiers to produce an output current proportional to the value of the response $Y_A$. Thus, any special model equation may be solved merely by scaling its influence coefficients to values less than unity and entering them directly on the dials of the appropriate coefficient potentiometers; and then by manipulating the control knobs or dials of the variable factor level generators to sweep through the desired range of levels of $x_1$ and $x_2$, the special model equation is evaluated in terms of the response under consideration.

Generally a certain range of values of interest are known for each variable factor. The center of this design range is usually taken as a normal condition and factor levels are measured in positive increments above and negative increments below the center level. Thus in setting up a model equation on the blend optimizer of the present invention the variable factors may take either positive or negative values. This is accounted for in the blend optimizer by providing both positive and negative reference potentials and manually controlled switches to selectively connect a voltage of the proper input polarity to the instant variable factor potentiometer. It should also be apparent that an equal mathematical probability exists that any one influence coefficient will be positive or negative. The negative influence coefficients are accounted for in the blend optimizer by manually controlled switches which automatically collect the positive coefficient terms on a positive amplifier bus and the negative coefficient terms on a negative amplifier bus.

The preferred embodiment of the analog computer of the present invention is designed to evaluate second-order functions in terms of as many as five variable factors and has eight channels to simultaneously accommodate as many as eight special model equations representing eight responses designed in terms of the five variable factors. However, the teaching of the present invention is not limited to the above configuration. Rather, by following the teaching of the present invention, it would be easily possible to construct an accurate and efficient special purpose analog computer capable of simultaneously evaluating any plurality of special model equations expressed in terms of 10 or more variable factors.

BRIEF DESCRIPTION OF THE DRAWINGS

For a better understanding of the present invention, together with further purposes and objects thereof, reference is made to the following disclosure and appended claims in connection with the accompanying drawings in which:

DETAILED DESCRIPTION OF THE INVENTION

The preferred embodiment of the invention is a special purpose analog computer capable of evaluating equations expressed as a function of five variable factors. Consequently it is important to consider that the special second-order model equation for a response $Y_A$ as a function of five variable factors $x_1-x_5$ may be given as $$Y_A = a_0 + \sum_{i=1}^{5} a_i x_i + \sum_{i=1}^{5} a_{ii} x_i^2 + \sum_{i=1}^{4} \sum_{\substack{j=2 \\ j \geq i}}^{5} a_{ij} x_i x_j \quad (2)$$

Rewriting equation (2) in terms of changes from the base level value it would appear as:

$$\Delta Y_A = Y_A - a_0 = \Sigma a_i x_i + \ldots \quad (3)$$

where the coefficient $a_0$ is merely a constant representing the predicted value of response $Y_A$ at the base level ($x_i=0, i=1, \ldots 5$) and need not appear explicitly in the programming of the equation.

It should be apparent that 20 individual terms would be added on the right-hand side in order to complete equation (3). These would include five main effect terms having single subscript coefficients ($a_1x_1, a_2x_2 \ldots a_5x_5$); five curvature terms having like double-subscript coefficients ($a_{11}x_1^2, a_{22}x_2^2 \ldots a_{55}x_5^2$); and 10 interaction terms having double unlike subscripts ($a_{12}x_1x_2, a_{13}x_1x_3, \ldots a_{45}x_4x_5$).

Special second-order model equations for seven other responses $Y_B-Y_H$ would appear in a form similar to equation (3), the only difference being the appearance of different constant influence coefficients as shown below:

$Y_B = b_0 + \Sigma b_i x_i + \Sigma b_{ii} x_i^2 + \Sigma\Sigma b_{ij} x_i x_j$  $Y_C = c_0 + \Sigma c_i x_i + \Sigma c_{ii} x_i^2 + \Sigma\Sigma c_{ij} x_i x_j$  $Y_D = d_0 + \Sigma d_i x_i + \Sigma d_{ii} x_i^2 + \Sigma\Sigma d_{ij} x_i x_j$  $Y_E = e_0 + \Sigma e_i x_i + \Sigma e_{ii} x_i^2 + \Sigma\Sigma e_{ij} x_i x_j$  (4) $Y_F = f_0 + \Sigma f_i x_i + \Sigma f_{ii} x_i^2 + \Sigma\Sigma f_{ij} x_i x_j$  $Y_G = g_0 + \Sigma g_i x_i + \Sigma g_{ii} x_i^2 + \Sigma\Sigma g_{ij} x_i x_j$  $Y_H = h_0 + \Sigma h_i x_i + \Sigma h_{ii} x_i^2 + \Sigma\Sigma h_{ij} x_i x_j$ It should be apparent that the numerical values for the constant influence coefficient terms for the special model equations above can be determined by the known analytical techniques previously mentioned. Furthermore, once these coefficients have been calculated, evaluation of the special equations is more susceptible of the use of a special purpose analog computer than a general purpose digital computer.

Figure 1:
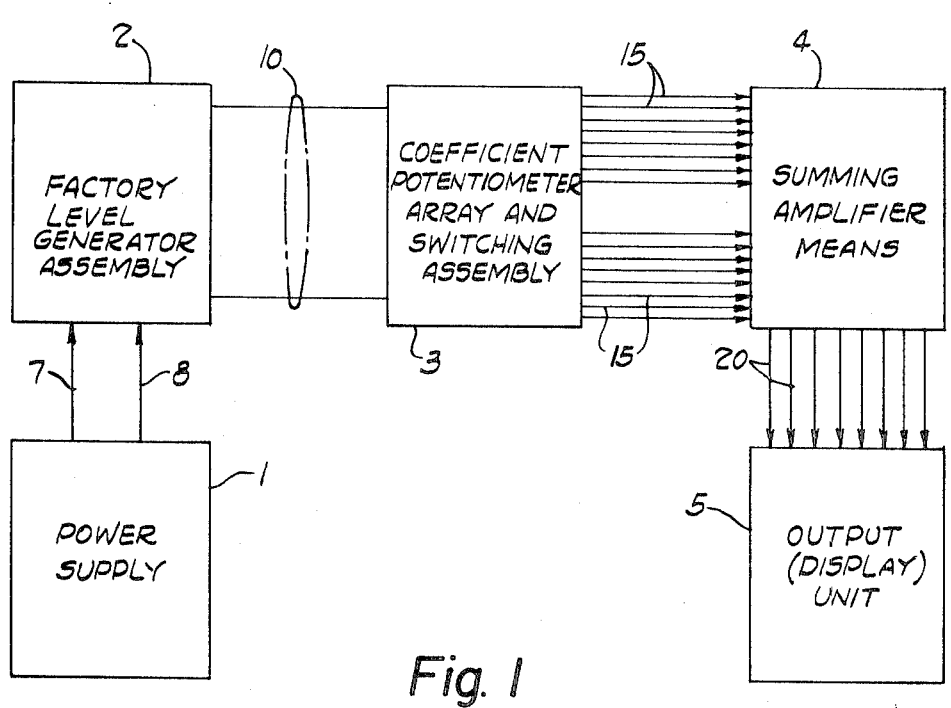
FIG. 1 is a block diagram of the special purpose analog computer or blend optimizer of the present invention.

FIG. 1 shows a block diagram of a special purpose analog computer designed to simultaneously evaluate the special model equations set forth above.

Referring now to FIG. 1 a block diagram of the special purpose computer or blend optimizer of the present invention is shown comprising a power supply 1, a function generator or factor level generator assembly 2, a coefficient potentiometer array 3, summing amplifier means 4, and an output or display unit 5.

Power for the summing amplifier unit and display unit is furnished from the supply 1 on line 7. In addition, supply 1 provides positive DC reference potentials and negative DC reference potentials to the potentiometer assembly 2 via line 8.

Assembly 2 is comprised of a plurality of manual knobs corresponding in number to the variable factors which are to be evaluated by the blend optimizer. Each knob controls the voltage level proportional to a factor as established by the function generator. This may be an operational amplifier connected as an integrator to generate a ramp voltage. The ramp voltage may be selectively energized by either a positive or negative reference voltage and the factor level generator sweeps through an adjustable range of voltages.

The factor level generator assembly 2 is arranged to develop output voltages representative of the $x_i$, $x_i^2$ and $x_i x_j$ terms of equation (2) in a manner to be explained in detail in connection with FIGS. 4 and 6.

The coefficient potentiometer array 3 is comprised of a plurality of individually mounted and operated potentiometers, a single pot being provided for each influence coefficient of each model equation to be evaluated by the computer optimizer. For example, evaluation of a five-variable response equation containing 20 terms would require 20 pots and an eight-channel system for simultaneously evaluating eight such model equations would require 160 coefficient pots.

The output voltages from the factor level generators of assembly 2 are furnished as inputs to the pots of array 3 along line 10. Each of the potentiometers of array 3 functions to multiply one of the voltages representing an $x_i$, or $x_i^2$ or $x_i x_j$ term by an influence coefficient as preset by that coefficient pot. Thus, the output of a potentiometer of array 3 is a voltage which represents the absolute value of a particular term of one of the model equations being evaluated. Furthermore, the polarities of the output voltages from the pots of array 3 are predetermined to be positive or negative, as required to correspond with the sign of the terms they represent, in a manner to be further explained. The output voltages representing positive terms are automatically collected as positive output values by means of a sign-switching assembly; while the output voltages representing negative terms are automatically collected as negative output values by the same means.

A pair of summing amplifiers are provided to receive outputs on lines 15 for each channel of the optimizer and are interconnected to combine the positive term voltages and the negative term voltages in proper relationship. The outputs of the respective pairs of summing amplifiers are then made available on a plurality of lines 20 to operate the display or output unit 5 in a number of alternative modes.

Figures 4, 5:
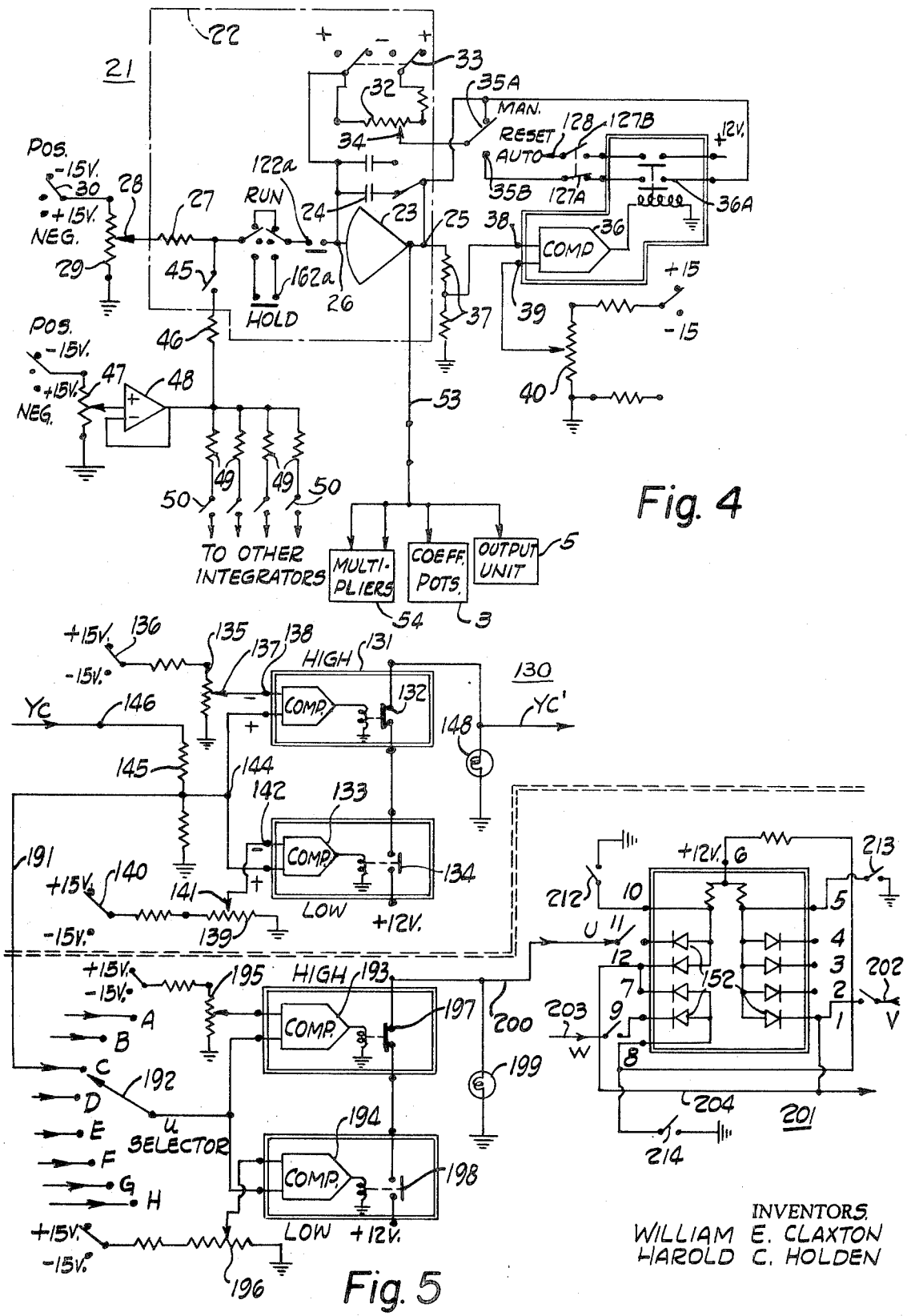
FIG. 4 is a schematic diagram of a typical factor level generator.
FIG. 5 is a schematic diagram of a search limit detection circuit.
Figure 6:
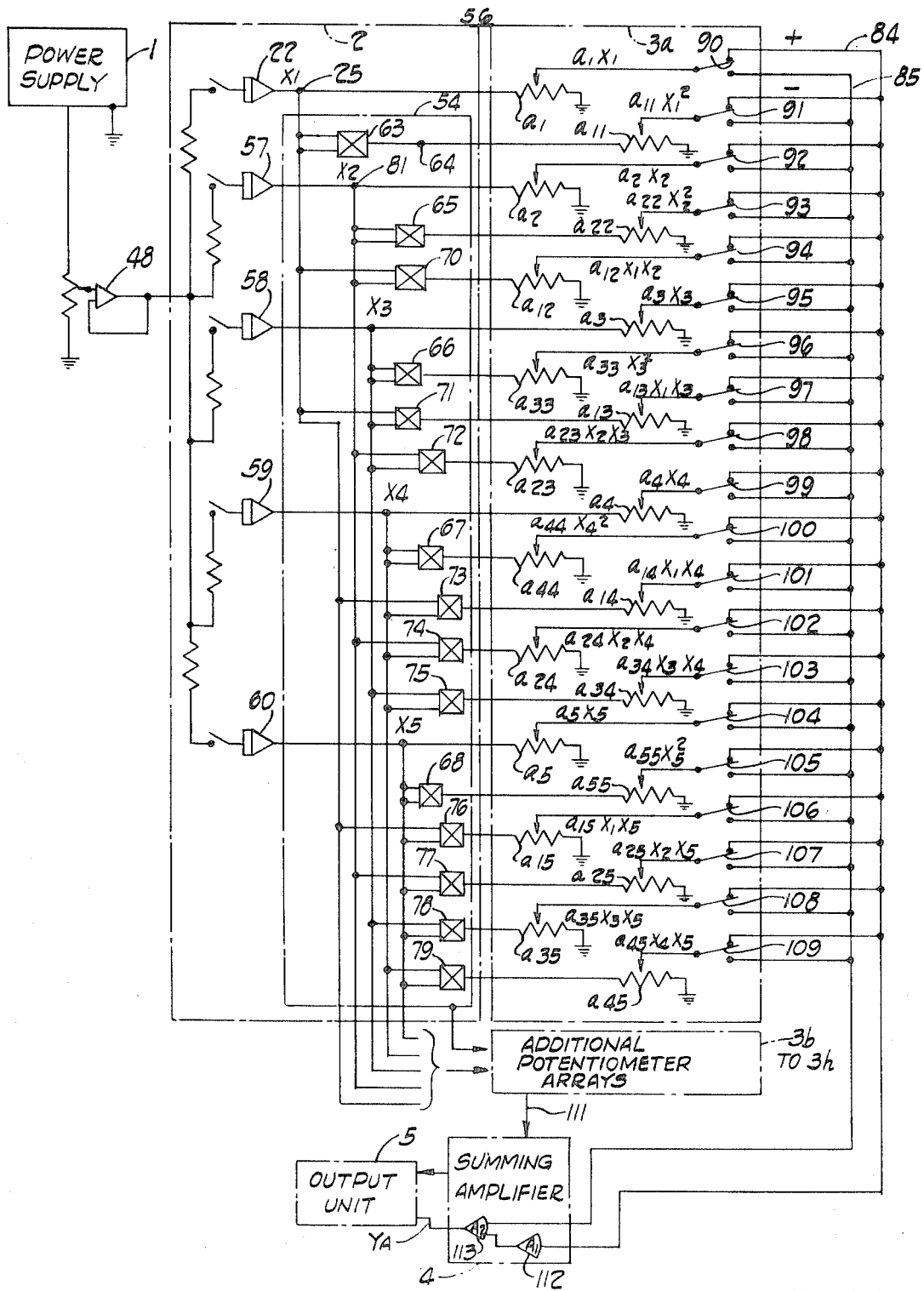
FIG. 6 is a schematic diagram of the factor level generator assembly and one bank of potentiometer arrays used in a preferred embodiment of the invention.

Referring now to FIGS. 4 and 6, typical circuits are shown for generating, respectively, voltages representative of $x_i$ main effect terms, the $x_i^2$ curvature terms and the $x_i x_j$ interaction terms.

FIG. 4 shows a schematic diagram of a factor level generator 21 which is the function generator of the preferred embodiment. This generator 21 includes an integrator 22 as a ramp generator and in this embodiment it generates a linear ramp starting at a negative value and capable of going through zero to a positive value. The integrator 22 includes an operational amplifier 23 or other high-gain amplifier connected to perform a mathematical operation; namely, integration. The amplifier 23 is connected as an integrator by having a capacitor 24 as a feedback from an output terminal 25 to an input terminal 26 and by having an input resistor 27 from a variable voltage terminal or tap 28 on a potentiometer 29. One end of the potentiometer is grounded and the other is connected through a polarity switch 30 to either a positive or negative regulated voltage from the power supply 1. The potentiometer 29 is an individual ramp rate potentiometer. A reset potentiometer is connected by a switch 33 to the power supply 1 so that either end of the potentiometer 32 may be made positive. This potentiometer has a variable tap 34 connected through switch contacts 35A and relay contacts 36A so that a variable voltage from potentiometer 32 is connected across the input and output terminals of the amplifier 23. The ramp voltage from the integrator 22 appears at the output terminal 25 and a certain proportion is fed by output resistors 37 to a first input 38 of a comparator relay 36. A second input 39 of this comparator relay 36 is connected to a variable tap of a ramp limit potentiometer 40 which is supplied with either a positive or negative voltage from the power supply 1.

The factor level generator 21 has the capability of generating a ramp voltage from about 10 volts negative through zero to about 10 volts positive. This will be a linear ramp voltage and the upper and lower limits of this ramp as well as the rate of rise may be predetermined. The setting on the ramp limit potentiometer 40 establishes the upper limit of the sweep of this ramp generator and the setting on the reset potentiometer 32 establishes the lower limit of starting this ramp voltage. The setting on the ramp rate potentiometer 29 determines the rate of rise of this linear ramp voltage. For example, if the capacitor 24 is 1.0 microfarads and the input resistor 27 is 1 megohm, then the RC time constant will be 1 second. Also, for example, if the voltage at the ramp rate potentiometer tap 28 is $-3$ volts, then the rate of rise will be 3 volts per second at the output terminal 25. Amplifier 23 is inverting, so a negative input voltage actually achieves an increasing output voltage. If the potentiometer 40 is set at $+9$ volts and the reset potentiometer is set at $-6$ volts then when the integrator 22 is placed in operation the voltage at the output terminal 25 will start at $-6$ volts and develop a linearly increasing voltage at the rate of 3 volts per second and at the end of 5 seconds will reach $+9$ volts at terminal 25. At this time the comparator relay 36 determines that the voltages at the two inputs 38 and 29 are equal, thus closing contacts 36A. The voltage from the power supply 1 acting through reset potentiometer 32 therefore applies the voltage of this potentiometer 32 across the input and output of the amplifier 23 and clamps the voltage at output terminal 25 at $-6$ volts. Accordingly this is a rapid flyback to reset the integrator to again start integrating at the preset rate from $-6$ volts forward the ramp limit of $+9$ volts. This is merely by way of example and any other upper and lower limits and ramp rate of the sweeping of the ramp generator may be preset by the potentiometers 29, 32 and 40.

The factor level generator 21 has plural inputs acting through a switch 45 and an alternative input resistor 46. A common ramp rate potentiometer 47 also energized from the power supply 1 acts through an amplifier 48 connected as a follower which amplifier has sufficient current capacity to supply the factor level generator 21 plus four other factor level generators 57, 58, 59 and 60 for $x_1$, $x_2$, $x_3$, $x_4$, and $x_5$. The additional integrators are fed through additional input resistors 49 and individual control switches 50.

The integrator 22 has its output at terminal 25 which also may be fed on line 53 to a series of multipliers 54, the coefficient potentiometer array 3 and the output or display unit 5.

FIG. 6 shows that there are 15 of the multipliers 54 in the computer optimizer. FIG. 6 shows one channel circuit 56 including the five integrators 22, 57, 58, 59 and 60 to generate the factor levels $x_1$, $x_2$, $x_3$, $x_4$, $x_5$. A first type of these multipliers 54 is shown by an amplifier 63 which has two inputs both connected to the output terminal 25 of the integrator 22 at which the voltage representative of factor level $x_1$ appears. Because both inputs to amplifier 63 are fed from $x_1$, the output of amplifier 63 at terminal 64 is proportional to $x_1^2$. There are five of this type of multipliers; namely, multipliers 63, 65, 66, 67 and 68 to generate currents proportional to $x_1^2$, $x_2^2$, $x_3^2$, $x_4^2$, $x_5^2$, respectively. These multipliers are commercially available as modules of one or a plurality of operational amplifiers, for example, the Philbrick/Nexus 4450 Model. These modules contain diodes and an inherent characteristic is that the current through the diodes is a logarithmic function of the voltage, so adding the logarithms results in multiplication. Accordingly, summing the two inputs results in a multiplied output.

FIG. 6 further shows that the multipliers 54 include a different use of multiplier 70 through 79 to generate interaction terms proportional to $x_i x_j$. The multiplier 70, for example, has two inputs one from output terminal 25 which is voltage representing factor level $x_1$ and a second input from a terminal 81 which is the output voltage from integrator 57 proportional to the factor level voltage $x_2$. Accordingly multiplier 70 has an output voltage proportional to voltage output $x_1 x_2$. The other multipliers 71–79 also have voltages proportional to the other $x_i x_j$ terms in the model equation.

The voltages from the 20 output terminals of the five integrators and 15 multipliers are next fed to the coefficient potentiometer array and switching assembly 3 which is also shown schematically on this channel circuit 56 of FIG. 6.

The potentiometer array 3 is actually in eight different parts with eight different banks of potentiometers. The bank 3a is shown in its entirety and includes 20 potentiometers each of which is connected to an output from the factor level generator assembly 2. Five of these potentiometers establish main effect coefficients $a_1$, $a_2$, $a_3$, $a_4$ and $a_5$. Five more potentiometers establish the coefficients for the curvature terms $a_{11}$, $a_{22}$, $a_{33}$, $a_{44}$ and $a_{55}$. Ten more potentiometers establish the coefficient for the interaction terms $a_{12}$–$a_{45}$. Accordingly at the output of these coefficient potentiometers, voltages representative of the $a_i x_i$ main effect terms, the $a_i x_i^2$ curvature terms and the $a_{ij} x_i x_j$ interaction terms are available. Each of these voltages is applied to either a positive bus 84 or a negative bus 85 by one of 20 switches. A switch 90 is used to connect the voltage representative of the $a_i x_i$ term to either the positive bus 84 or the negative bus 85. The position of this switch 90 is always set to a positive position if the $a_i$ coefficient is positive and to a negative position if the coefficient $a_i$ is negative. The remaining switches 91–109, respectively, are used to connect the other 19 terms to either the positive bus 84 or negative bus 85 according to whether the coefficient is positive or negative.

The 20 voltages representative of the factor levels from the assembly 2 are fed to seven additional potentiometer arrays $3b$ to $3h$. This makes a total of 160 potentiometers in this preferred embodiment wherein eight different responses or characteristics may be investigated by this computer optimizer. The voltages representative of the main effect terms $x_1$–$x_5$ are shown as being directed to these additional potentiometer arrays at the bottom of FIG. 6 and additionally the other 15 output voltages from the multiplier 54 are fed to these same seven additional potentiometer arrays $3b$ to $3h$. Voltages from the additional potentiometer arrays $3b$ to $3h$ are then fed on lines 111 to positive and negative buses similar to buses 84 and 85.

The various voltages on the positive and negative buses 84 and 85 are summed in summing amplifiers 112 and 113 in the summing amplifier means 4. Thus there will be a total of 16 summing amplifiers in the summing amplifier means 4. The positive bus 84 leads to the summing amplifier 112 which inverts this signal and it is then fed into an input of the summing amplifier 113 to again be inverted and appear as a positive or negative signal supplied to the output unit 5. The negative signals on the output bus 85 are fed to another input of the amplifier 113 whereat they are inverted to become positive signals and then fed to the output unit 5. In like manner the seven other sets of voltages from the potentiometer arrays of $3b$ to $3h$ are summed in the summing amplifier means 4 and fed to the output unit 5.

The FIGS. 1 and 6 show a main portion of the analog computer wherein the power supply 1 may be considered a voltage source, the factor level generator assembly 2 is function generator means having a first output voltage appearing on the line 10. The coefficient potentiometer array and switching assembly 3 is a means for multiplying the first output voltage of the function generator means by a first predetermined value to produce a second output voltage on the lines 15 proportional to the product of the first output voltage and said first value. The summing amplifier means 4, which includes the $A_1$ and $A_2$ amplifiers 112 and 113 is a means connected to amplify this second output voltage. The output unit 5 includes a voltmeter for reading the various voltages and includes the oscilloscope display unit shown in FIG. 2.

Figure 3:
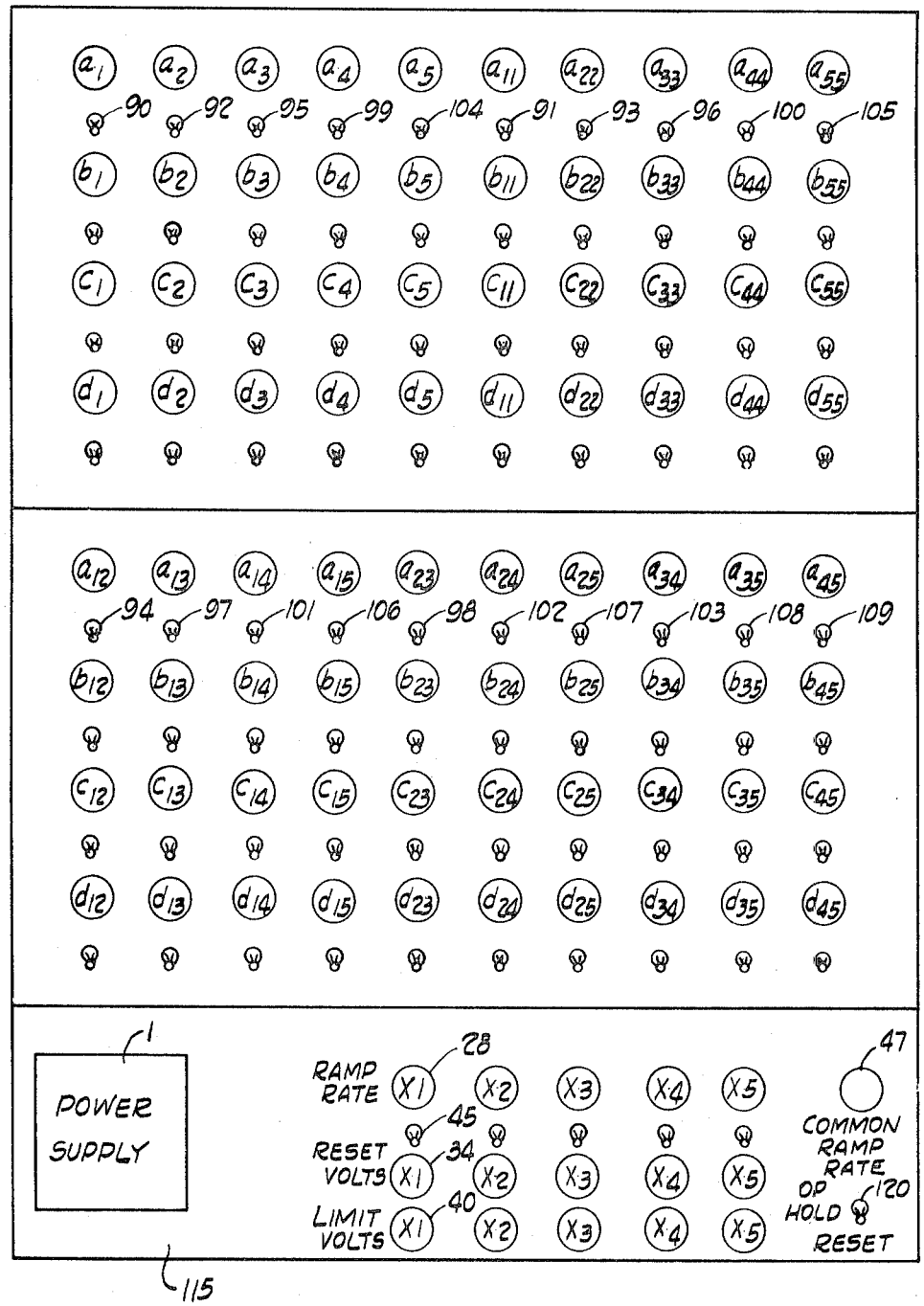
FIG. 3 is a diagrammatic view of a console, housing a coefficient potentiometer array and switching assembly as well as knobs for a variable factor level generator assembly used in a preferred embodiment of the invention.

FIG. 3 shows a front view of a console 115 which houses the power supply 1, the factor level generator assembly 2 and 80 potentiometers of the coefficient potentiometer array. The console shown in FIG. 3 may be operated in combination with a summing amplifier unit and a display unit, not shown, as a four-channel optimizer. However in actual practice, a second identical console is interconnected with console 115 to function as a unified eight-channel optimizer.

At the lower portion of the console five sets of knobs or dials X1-X5 are shown upon which the desired factor values may be set. A first row of knobs sets the individual ramp rate for the linear ramp voltage generated by each integrator. The first knob has reference numeral 28 to correspond to this same potentiometer 28 in FIG. 4. Immediately below this set of factor level knobs is a set of five switches and switch 45 corresponding to factor level $X_1$ is the switch 45 shown on FIG. 4. Below this set of five switches there are five dials or knobs such as knob 34 to establish the ramp reset volts as shown by the ramp reset potentiometer tap 34 in FIG. 4. Next below is another set of five knobs such as shown by knob 40 to indicate the potentiometer 40 on FIG. 4 which establishes the ramp limit voltage or upper limit of the sweeping of the ramp voltages. Also shown on this console is the common ramp rate potentiometer knob 47 to set the ramp rate of all of the five integrators. A master mode switch 120 is shown to control the operate, hold or reset modes of the computer optimizer.

Eighty of the coefficients of the potentiometer array 3 are mounted on the console in banks of 10 located above in the factor level generator assembly. Each potentiometer may have a dial to indicate the actual voltage set by that potentiometer or the value of the voltage established by that potentiometer may be read upon a voltmeter switched by a crossbar switching assembly to read the output from that particular potentiometer at that time. Each potentiometer may be positioned at a value corresponding to a predetermined scale of the coefficient for one of the terms for a model equation. Consequently the voltage picked up by the wiper of each of the potentiometers will be proportional to the product of the potentiometer input voltage and the coefficient value set on the dial of such potentiometer.

The output of amplifier 113 comprises an analog signal which is proportional to the response $Y_A$ and may be used to drive the display device 5. There will be seven other outputs from the summing amplifier means 4 proportional to the responses $Y_B$-$Y_H$, all used to drive the display device 5.

Depending upon the particular application to which the present invention is being put, a number of types of output units 5 may be used. For example, a simple voltmeter may be used or if it is desired to compare or plot a first response $Y_A$ against a second response $Y_B$, an X-Y plotter of conventional design, such as the Electronic Associates, Inc. VariPlotter No. 1110 may be conveniently used. The summing amplifier and output display device can be mounted in the same or a separate console in any convenient manner.

Figure 2:
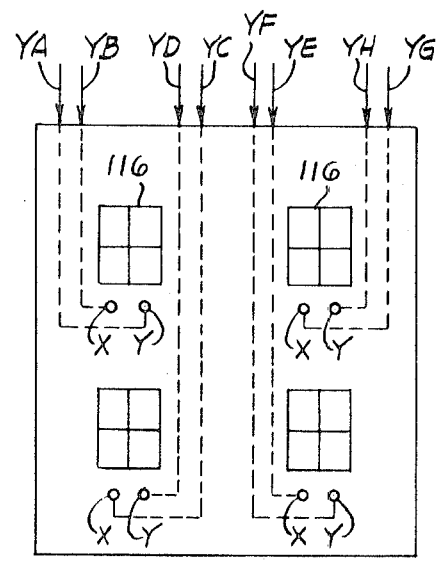
FIG. 2 is a diagrammatic view of a display unit which may be used as an output device in connection with the computer optimizer of the present invention.

A more sophisticated type of display unit 5 is shown in FIG. 2 which was designed to facilitate optimization studies. In the system shown four conventional oscilloscopes 116 are supported by a console, arranged in a symmetrical array. Four of the eight response signals $Y_B$, $Y_C$, $Y_E$, and $Y_G$ from the summing amplifier 4 are used respectively to drive the $x$ inputs of the oscilloscope, while the remaining signals $Y_A$, $Y_D$, $Y_F$ and $Y_H$ are used to drive the $y$ inputs. The display is programmed so that the beams of the four oscilloscopes converge toward the center of the display array as an ideal blend is approached. This enables an operator to easily and rapidly adjust the variable factor knobs to achieve optimization.

Figure 8:
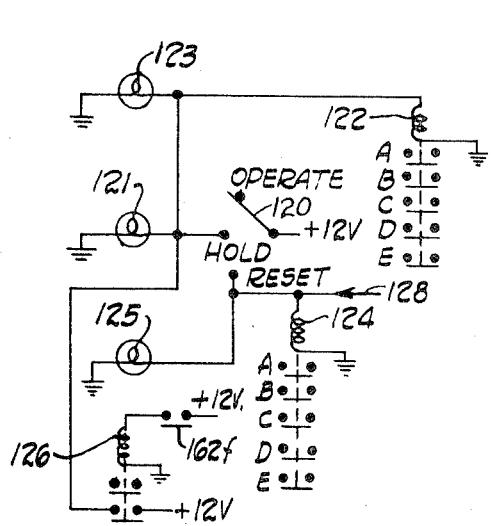
FIG. 8 is a schematic diagram of a master mode relay circuit.

FIG. 8 shows a master mode switch 120 having a center hold position in which a hold lamp 121 is energized from a voltage from the power supply 1. This switch 120 has an operate position which energizes a master operate relay 122 and simultaneously an operate lamp 123. The switch 120 has an alternate reset position to energize a master reset relay 124 and simultaneously a reset lamp 125. The master operate relay 122 has five contacts A, B, C, D and E and each is connected in the input of one of the five integrators 22, 57, 58, 59 or 60. FIG. 4 shows this relay contact 122A connected to the input terminal 26 of integrator 22. The master reset relay 124 has five normally open contacts A, B, D C, D and E, each of which is connected in the output circuit of one of the integrators. FIG. 4 shows the relay contacts 124A connected in series with the feedback capacitor 24 between the input and output of the operational amplifier 23. Accordingly when the manual/automatic switch 35 is in the automatic position 35B, and the master reset relay 124 is energized, then the respective integrator will be reset each time the comparator relay 36 is energized. FIG. 8 also shows a cam switch relay 126 having contacts $a$ and $b$ as described below.

The comparator relay 36 in FIG. 4 has contacts 36B connected in series with a normally open slave switch contact 127B and to a conductor 128. These two switches are connected between a positive voltage source terminal and the upper end of the master reset relay coil 124, shown on FIG. 8. The slave switch 127 also has a normally closed set of contacts 127A connected in series between the comparator contacts 36A and the reset contacts 35B. The two slave switch contacts 127A and 127B are ganged together to be operated in unison with one normally closed and the other normally open This slave switch is particularly useful to make sure that all five integrators are reset at the same time such as during demonstrations and the resetting will occur when the slave switch is thrown so that contacts 127B are closed. This means that whenever the comparator relay 36 is energized, contacts 36B are closed and all the integrators are reset by means of the master reset relay 124.

FIG. 5 shows a search limit detection circuit 130 which is a part of the output unit 5. This circuit 130 includes comparator relays 131 and 133. Relay 131 has normally closed contacts 132 and relay 133 has normally open contacts 134. A high-limit set potentiometer 135 is connected between ground and either a positive or negative terminal of the power supply 1 by a polarity selector switch 136. A variable tap 137 of this potentiometer is connected to the negative input terminal 138 of the comparator relay 131. A low-limit set potentiometer 139 is connected between ground and positive or negative terminals of the power supply 1 by a polarity selector switch 140. A variable tap 141 of this potentiometer 139 is connected to the negative terminal 142 of the comparator relay 133. The positive terminals of the comparator relays 131 and 133 are interconnected at a terminal 144 and connected to a tap of a voltage divider resistor 145 which is connected to an input terminal 146 of the output unit 5. This input terminal 146 is a terminal at which any one of the response voltages $Y_A$-$Y_H$ is available. As shown in this FIG. 5 the incoming response voltage $Y_C$ is that which representatively is applied to terminal 146 from the coefficient array 3. This is merely by way of example.

The comparator relays 131 and 133 determine when the voltage coming in on terminal 146 is between a high and a low limit; that is, whether it is within a predetermined range. When the incoming voltage is in excess of that set in the low-limit potentiometer 139 then the comparator relay 133 will be energized and the normally open contacts 134 will thus become closed. When the incoming response voltage exceeds the value set on the high-limit potentiometer 135 then the comparator relay 131 is energized to open the normally closed contacts 132. As long as the incoming voltage is between the high and low limit values, then both contacts 132 and 134 will be closed and hence a voltage from power supply 1 is passed to illuminate a lamp 148 and is passed on a line $Y_C'$ to a logic circuit 150 as shown in FIG. 7.

This logic circuit 150 includes several diode logic printed-circuit boards or modules and one such module 151 is an AND-OR-Invert module. This module shows at the left side three different incoming lines $Y_A'$, $Y_B'$, and $Y_C'$. Each passes to a reversely poled diode 152 to bias off each of these diodes when the respective search limit detection circuit is within the range of high and low limits. By so biasing off the respective diode, then current does not pass from the +12-volts of power supply 1 through a resistor 153 and any one of these diodes 152 and the respective lamp 148 to ground. If one of these search limit detection circuits 130 is not within range then current is leaked to ground through resistor 153, a diode 152 and the corresponding indicator lamp 148 and a large voltage drop appears across resistor 153 making the anodes of the diodes 152 at a low potential relative to ground. This voltage is sufficiently low so that this voltage is not passed through diodes 154 and 155 to a transistor 156. Accordingly this transistor 156 is not turned on. However, when all search limit detection circuits 130 are within range, then a high voltage in this example +12 volts, is applied on each of the lines $Y_A'$, $Y_B'$ and $Y_C'$. Accordingly a high voltage appears on the anodes of these diodes 152 which voltage approaches +12 volts and this high voltage turns on transistor 156. This establishes a voltage drop across a resistor 158 and a low voltage relative to ground at a terminal 157 when transistor 156 is on and a high voltage approaching 12 volts at terminal 157 when transistor 156 is off. The +12 volts from the power supply 1 is also supplied along a line 160 to an integrator hold relay 161. This relay has a coil 162 and six normally open contacts $a$-$f$. Contact 162$a$ is connected in the input circuit of the integrator 22 of FIG. 4 and similarly the other contacts 162$b$ through $e$ are connected in the inputs of the other integrators 57–60. A line 163 connects the other end of the relay coil 162 through a transistor 164 to ground. The base of transistor 164 is connected to the terminal 157 and when terminal 157 has a high voltage thereon transistor 164 is turned on energizing relay 161. Conversely when terminal 157 has a low voltage as when transistor 156 is turned on, transistor 164 is turned off and relay coil 162 is deenergized. Transistor 164 is a part of a transistor module 165 and additional transistors 166 and 167 may be paralleled with transistor 164 for added current-carrying capacity for the requirements of relay coil 162.

A diode module 170 contains additional diodes 152 reversely connected to input terminals from search limit detection circuits $Y_D'$ through $Y_H'$. The anodes of all of these diodes 152 are interconnected by a line 171 to be paralleled with the anodes of the diode 152 of the AND-OR-Invert module 151. All of these interconnected anodes of the diodes 152 may be conveniently referred to as an AND channel. In this circuit arrangement the computer optimizer will go automatically into HOLD whenever, for example, all eight responses are in limits simultaneously. This is written in logic notation simply as $Y_A \cdot Y_B \cdot Y_C \cdot Y_D \cdot Y_E \cdot Y_F \cdot Y_G \cdot Y_H$. If all of these channels are within limits simultaneously then the eight search limit detection circuits similar to that shown in FIG. 5 will have a high voltage, shown as +12 volts, on the appropriate input channel $Y_A'$–$Y_H'$. This will turn on transistor 156, turn off the transistors 164, 166 and 167 and deenergize relay 161. Accordingly this opens the integrator hold relay contacts 162$a$ through 162$e$. Referring now to FIG. 4 this opens the input to each of the five integrators and the output of these integrators will accordingly hold the value which they have reached at that instant. When in the hold condition of the integrators, the output of each of these integrators may be read on a voltmeter, for example, a digital voltmeter, to determine the value of the various integrator outputs which resulted in the response values which were satisfactory.

Figure 7:
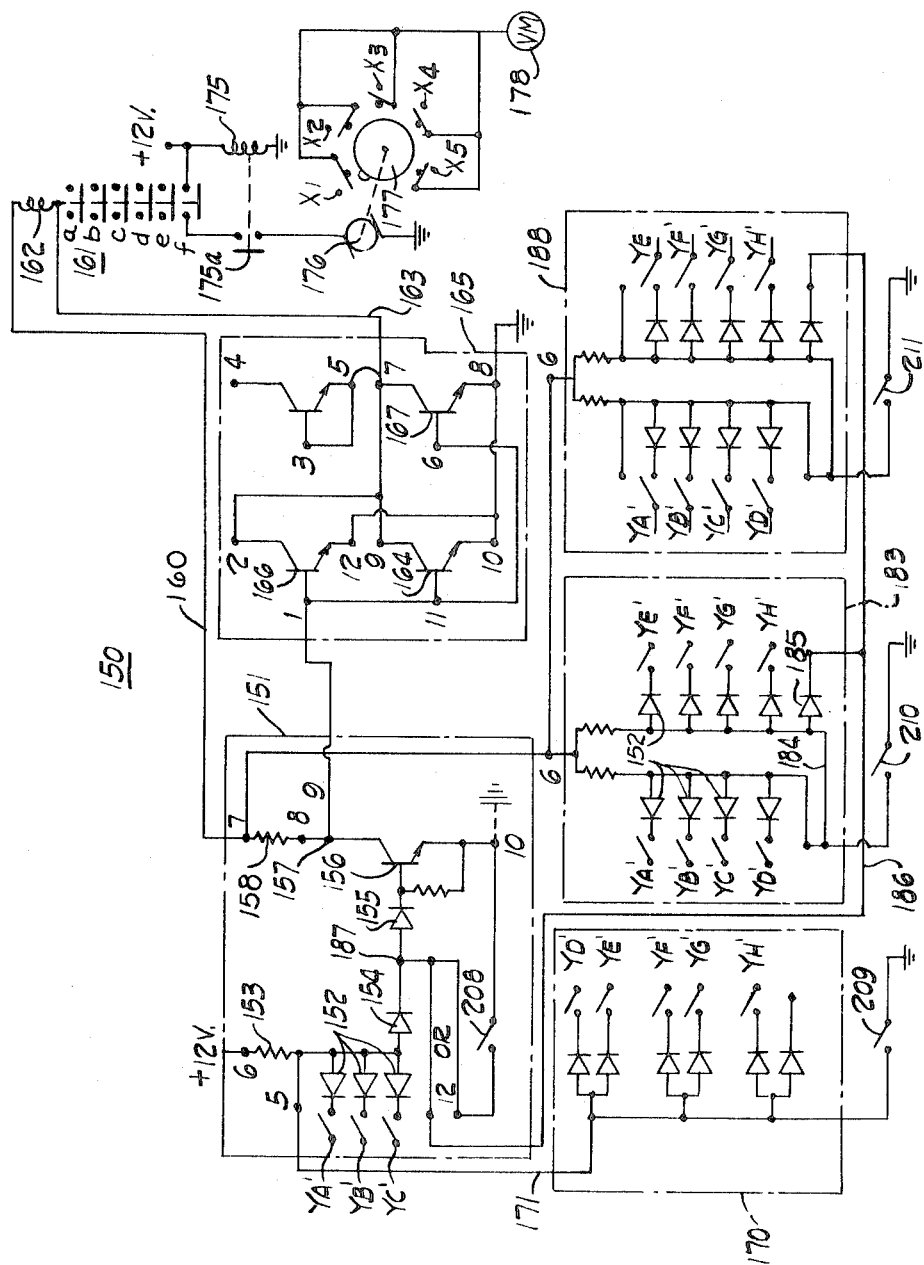
FIG. 7 is a schematic diagram of a logic circuit.

FIG. 7 shows one such possible circuit for use in reading the output values of the integrators at the time when the computer is in hold. The relay contact 161$f$ is a normally open contact and will be opened when the relay coil 162 is deenergized during the HOLD condition. This deenergizes a coil of a cam switch motor relay 175 and normally closed contacts 175$a$ thereof accordingly closed to energize a cam switch motor 176. This drives a cam 177 to sequentially close switches connected to the outputs of the integrators and to connect them to a voltmeter 178. This gives a sequential reading and it may be a recording type of voltmeter to give a sequential printout of the various voltages. In one computer optimizer constructed in accordance with this invention, the motor-driven cam switch provided a sequential readout on a digital voltmeter and successive printing of the following in the order given; +15-volt power supply, −15-volt power supply, factor levels $X_1$ through $X_5$, and responses $Y_A$ through $Y_H$. The printout of the power supply voltages was merely to reassure the user of this information that the computer was operating normally at a regulated power supply voltage and that the voltages for the $x_i$ and the Y response values were proper values.

FIG. 7 also shows a digital logic module 183 which is an OR1 channel. Oftentimes one cannot get all responses in the desired ranges simultaneously and usually there are perhaps three or four responses of principal interest. The OR1 channel permits specifying a second combination of interest. For example, suppose the AND channel has been programmed to HOLD whenever all eight responses are in limit simultaneously. If $Y_C$, $Y_F$ and $Y_H$ are not of much concern it would be desirable to program the OR1 channel for HOLD for the condition $Y_A \cdot Y_B \cdot Y_D \cdot Y_E \cdot Y_G$, which can easily be done by appropriate switch settings at the OR1 channel on the limit-sensing panel. The OR1 module 183 has a plurality of the diodes 152 and again the voltages $Y_A'$–$Y_H'$ may be connected through switches to the cathodes of these various diodes. The anodes are all interconnected to a conductor 184 and through a diode 185 to a conductor 186. This conductor is connected to a terminal 187 at the junction of the diodes 154 and 155 in module 151. Accordingly when the selected ones of the responses are within range, in the above example, $Y_A \cdot Y_B \cdot Y_D \cdot Y_E \cdot Y_G$ − G, then high voltage will be applied to the cathodes of all of the diodes 152 on module 183 and accordingly no more leakage current may pass from the anode to the cathode of any of these diodes. This means that the potential on the anodes will rise, which is the voltage on the conductor 184. Accordingly diode 185 will conduct and diode 155 on module 151 will conduct to turn on transistor 156. As noted above this turns off transistor 164 and turns off relay 161 to again go into the HOLD condition and have a sequential printout of the $x_i$ factor level and Y response voltages.

The computer optimizer may also include an OR2 channel as provided by a module 188. This permits specifying still another condition for HOLD which functions exactly like the OR1 channel. Thus in our present example let us assume that $Y_A$ and $Y_E$ and $Y_G$ are really the three responses of vital interest. Accordingly one could specify the HOLD condition $Y_A \cdot Y_E \cdot Y_G$ for the OR2 channel. This module 188 shows that it is possible through switches to connect any one or all of the responses $Y_A'$ through $Y_H'$ to the cathodes of the diodes 152 and accordingly this module 188 will operate in the same manner as the OR1 channel module 183. The complete three-channel HOLD specification in logic notation would then be $Y_A \cdot Y_B \cdot Y_C \cdot Y_D \cdot Y_E \cdot Y_F \cdot Y_G \cdot Y_H + Y_A \cdot Y_B \cdot Y_D \cdot Y_E \cdot Y_G + Y_A \cdot Y_E \cdot Y_G$ wherein the (·) symbol is read "and" and the (+) symbol is read "or". The computer optimizer would then automatically go into HOLD when any of these three specified conditions was satisfied.

Oftentimes one would be willing to accept a somewhat lower value for one response provided a second response were sufficiently high. In the present example suppose $Y_A$ is tire wear, $Y_E$ is skid resistance and $Y_G$ is compound cost. Although the compound being studied might be intended primarily for original equipment tires where good wear would be important one might also be interested in using the compound for customers wanting tires giving low-cost mileage if a sufficiently good combination of wear, skid resistance and cost could be found even though the value of the wear was considerably below the acceptable level for original equipment accounts. One is therefore faced with the desirability to set up independent high-low limits for these three responses. The computer optimizer for the present invention provides for these three special limit set channels identified as U, V and W. The selector knob at each of these special channels can be connected to any of the responses $Y_A-Y_H$ and independent high-low limits set up as exactly described above. Thus in the present example one would select $Y_A$ at U, $Y_E$ at V and $Y_G$ at W. New sets of limits would then be set up for these three responses given the additional specification U·V·W. The complete automatic search specification would then read $Y_A \cdot Y_B \cdot {}^AY_C \cdot Y_D \cdot Y_E \cdot Y_F \cdot Y_G \cdot Y_H + Y_A \cdot Y_B \cdot Y_D \cdot Y_E \cdot Y_G + Y_A \cdot Y_E \cdot Y_G + U \cdot V \cdot W$.

The lower half of FIG. 5 shows one of these three special limit set channels in this case illustrated as the U channel, however, those for V and W will be identical circuits. The signal from the voltage divider 145, in this case of FIG. 5 shown as $Y_C$, is fed by a conductor 191 to an eight-position selector switch 192. From here the signal passes to a high-comparator relay 193 and a low-comparator relay 194. A high-limit potentiometer 195 and a low-limit potentiometer 196 set the values at which the high and low comparator relays 193 and 194 will be actuated and when the selected Y response signal is within range, then the contacts 197 and 198 will be closed to illuminate the lamp 199 and pass a signal on the U channel 200 to the cathode of one diode 152 on the special limit search module 201. A V input signal may be applied to a channel 202 and a W input signal may be applied to an input channel 203 with each of these input channels going to cathodes of the diodes 152. This special limit search module therefore operates in the same ways as the OR1 and OR2 modules 183 and 188 and when all of the channels U, V, and W are in range, then the voltage on all of these channels 200, 202 and 203 raises to approximately 12 volts to stop leakage current through the diodes 152 and accordingly the voltage rises on a conductor 204. This conductor is connected to terminal 187 on board 151 of FIG. 7 which will cause turn on of the transistor 156 and deenergization of the relay 161 for the HOLD and sequential printout conditions described above. By means of a special toggle switch arrangement, channels U, V and W can be combined for any desired logic combination: U·V·W, U·V+W·U+V·W, U·W+V, U+V+W.

An Inhibit All switch 208 connected to terminal 187 of module 151 may be closed and in such condition prevents the computer optimizer from automatically going into HOLD even though all of the specified search conditions are satisfied. An Inhibit And switch 209 is connected to conductor 171 of module 170 and when closed prevents the computer optimizer from automatically going into HOLD even though all of the AND search conditions are satisfied. Similarly an Inhibit OR1 switch 210 and an Inhibit OR2 switch 211 are connected to the modules 183 and 188 to inhibit these search conditions. Suppose for example that during an automatic search a sufficient number of combinations have been found for the OR2 channel specification $Y_A \cdot Y_E \cdot Y_G$. By merely flipping the OR2 Inhibit switch 211 to the closed condition, the search can proceed without further interruptions whenever this specification is satisfied. Inhibit U, V and W switches 212, 213 and 214 switches are provided on module 201.

In the automatic search condition using the common ramp rate potentiometer 47, it is desirable to set the ramp rates so that the ramp rate of integrator $X_4$ is for example, five times as fast as that of integrator $X_5$; ramp rate of integrator $X_3$ is five times as fast as that of $X_4$; the ramp rate of integrator $X_2$ is five times as fast as that of $X_3$ and the ramp rate of integrator $X_1$ is five times as fast as that of $X_2$. To accomplish this with a single capacitor 24, the input resistor 49 may be made larger by a scale of five for each of the successive integrators, for example, the input resistor 46 to integrator $X_1$ may be 100K, input resistor 49 to integrator $X_2$ will be 500K, the input resistor to the integrator $X_3$ would be 2.5 megohms, the input resistor to integrator $X_4$ would be 12.5 megohms and the input resistor 49 to the integrator $X_5$ would be 62.5 megohms. This will assure a successive sweeping through the various ramp voltages to effectively provide all combinations of output voltages of the integrators $X_1-X_5$ to thus determine which combinations of these factor levels provide the desired responses Y.

Figure 9:
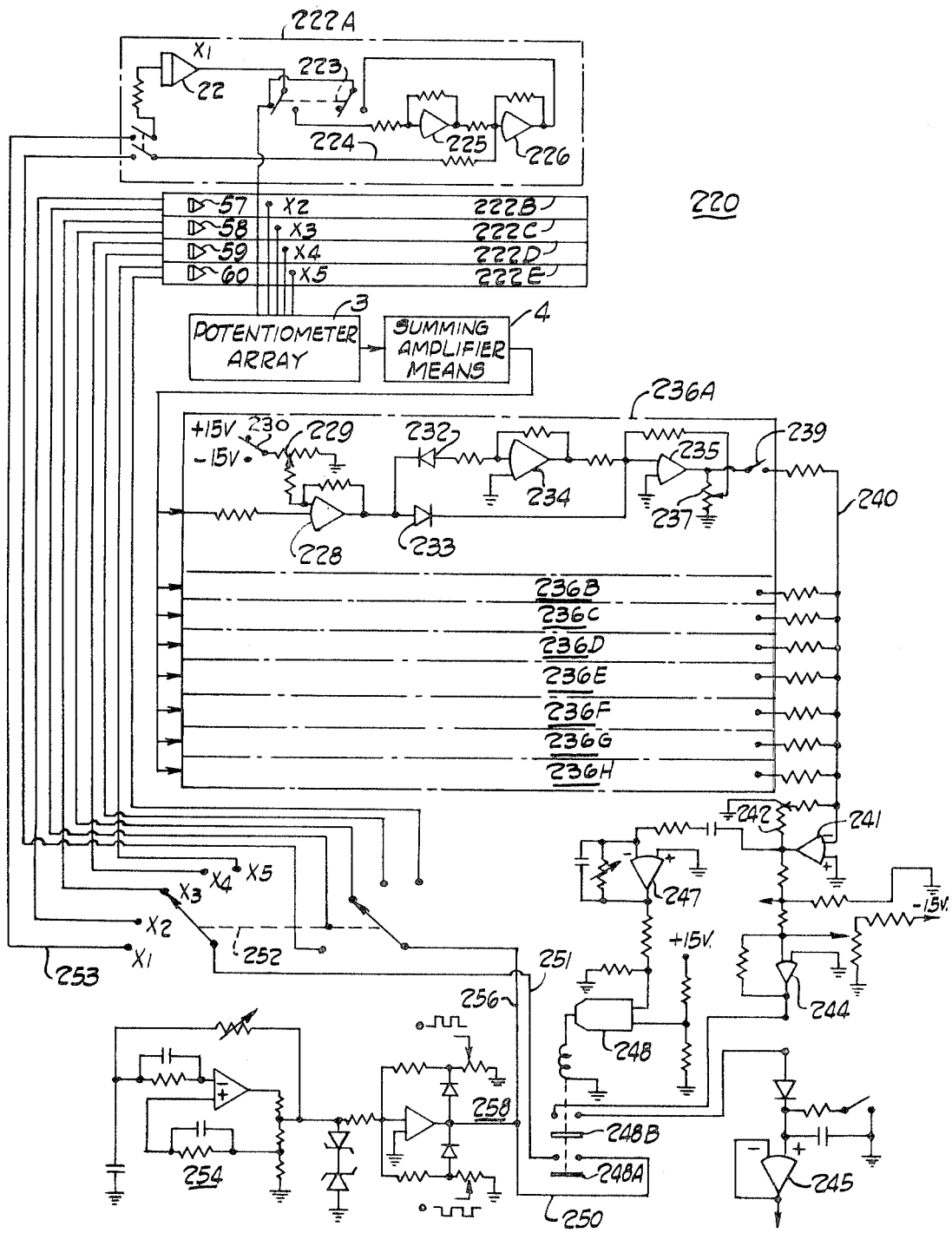
FIG. 9 is a schematic diagram of a combination search circuit.

The computer optimizer of the present invention includes a combination search circuit 220 shown in FIG. 9. The general idea for operation of this circuit is that small rapid changes in one of the factor levels is made, which is a perturbing signal. The circuit observes the results on all of the responses and obtains a measure of the sum total error defined as the sum of "absolute values specified for each response minus the corresponding instantaneous values observed." Whenever the instantaneous perturbing signal causes a reduction in the total sum error, the factor level is permanently changed in the direction indicated by the perturbing signal. The factor level generator will be in the HOLD mode except during this brief interval of factor level change which will correspond to an OPERATE mode permitting integration to occur. The perturbing signal itself bypasses the integrator and is introduced at an operational amplifier used as a summer so that the perturbing signal can produce only a temporary change in factor level in contrast to the permanent change produced by the integrator. The perturbing signal is successively switched to different factor level channels and thus the total sum error will be rapidly minimized. When and if this error becomes zero the specified combination for all responses will have been attained.

As an example, one may again assume the use of five factor channels $X_1-X_5$ and eight response channels $Y_A-Y_H$. The FIG. 9 is a schematic diagram largely confined to the response channel $Y_A$ and to the factor level channel $X_1$ although the other response channels and factor channels are indicated. In this FIG. 9 the integrator 22 to generate the factor level $X_1$ is shown as a part of an inverter 222A. When the combination search circuit 220 is not in use, switch 223 is in the position shown and the normal $X_1$ output is obtained, as described above. When the combination search circuit 220 is in use at factor channel $X_1$, then switch 223 will be in the other position than that shown. It will now be observed that in the absence of a perturbing input voltage on conductor 224 at an amplifier 226 that the $X_1$ output from integrator 22 is now routed through two unity gain inverter amplifiers 225 and 226 hence back to its normal output terminal to the coefficient potentiometer array 3. In the absence of a perturbing input voltage on conductor 224, the $X_1$ output remains unchanged since the two unity gain inversions perserve its polarity as well as its magnitude. The effect of a perturbing input voltage is discussed below.

With a fixed combination of source term voltages determined by outputs $X_1$, $X_2-X_5$, connected to the coefficient array 3, these source terms are multiplied by appropriate coefficients $a_1$, $a_2-a_5$ and the terms are summed at response $Y_A$ by the summing amplifiers 112 and 113 in the summing amplifier means 4. The output of the amplifier 113 would be identical to the $Y_A$ output except the latter may be scaled upwardly or downwardly by a potentiometer on the coefficient array panel. For this reason it is preferred to bring the output directly from the $a_2$ amplifier 113 as an input to amplifier 228 in FIG. 9. In setting up for a run in combination search, a calibration potentiometer would be supplied to the response channel $Y_A$ coefficient array and the potentiometer adjusted until the desired response value for $Y_A$ is read on the voltmeter. The voltmeter would then be connected to read the output of amplifier 228 and the null potentiometer 229 and polarity switch 230 in FIG. 9 would be adjusted until the reading on the voltmeter becomes zero. The null potentiometer would then be locked in this position and the calibrate potentiometer disconnected. The output of amplifier 228 now provides a linear measure of the difference between the specified and actual value of response $Y_A$. Amplifier 228 thus becomes an error detection amplifier 234 and 235 provide an absolute value circuit. The error detection amplifier 228 and the absolute value circuit together form an error detection circuit 236A. An increased potentiometer 237 is provided at amplifier 235 so that the output of this amplifier becomes: $|W_a E_a|$, where $W_a$ represents a weighting factor $\geq 1$ and $E_a$ is the absolute value of the channel $Y_A$ error from its desired value. Switch 239 permits elimination of the channel $Y_A$ error signal if the value for this response is of no concern.

The output of amplifier 235, the channel $Y_A$ absolute value error is passed by a conductor 240 and summed at an amplifier 241 along with the error signals from all the other channels involved in a given specification of response values. To accomplish this there are five inverter circuits 222A through 222E and there are eight of the error detection circuits 236A to 236H. It is the outputs from these error detection circuits 236A to 236H which are summed in the amplifier 241. This amplifier 241 also has an increase potentiometer 242 connected to its output, hence its output equals:

$$W_T \sum_{i=1}^{8} |W_i E_i|$$

where $W_T$ is $\geq 1$ for an overall weighting factor for obtaining increased sensitivity if desired when very close to the specified combination. The output of this amplifier 241 is connected back to the automatic search and readout select panel so that the sum of the total error to be monitored on the voltmeter, plotted, etc. The output from amplifier 241 is supplied to amplifiers 244 and 245 to provide for holding the value of minimum error obtained during a combination search run and the output of amplifier 245 may be used as an input to automatic search detection on a subsequent run to automatically cause a master mode HOLD and Sequential Print when this minimum value is reached.

The output from amplifier 241 is also connected to an amplifier 247 which is used in a differentiation circuit, hence its output will be positive or negative according to whether the total sum error from amplifier 241 is increasing or decreasing, respectively. The output of amplifier 247 is connected to one input of a comparator relay 248 and this comparator is biased so that the comparator relay is energized whenever the absolute value of the total error is decreasing, e.g. the derivative voltage is negative. When the comparator relay 248 is energized, the normally open relay contacts 248A and 248B will close, contacts 248A providing a path on a conductor 250 connecting the instantaneous perturbing signal to the $X_1$ integrator 22 input through a conductor 251, a scanner switch 252 and a conductor 253. The perturbing signal is shown as being a positive and negative going square wave from a square wave generator 254 which appears on the conductor 250 and a conductor 256. The voltage on conductor 256 is a perturbing signal also applied to another pole of the scanner switch 252 as perturbing signal inputs, for example, on conductor 224 to amplifier 226. The scanner switch 252 is shown in FIG. 9 as being connected to the $X_3$ input. It scans sequentially through the $X_1$–$X_5$ inputs. Since the perturbing square wave signal is momentarily connected to the $X_1$ output regardless of whether the comparator relay 248 is energized, and since the input to the $X_1$ integrator 22 is connected only when the comparator relay 248 is energized, e.g. the total absolute value sum error is decreasing, the $X_1$ integrator 22 output is permitted to change its value only in a direction that will decrease the total sum error.

For example, if a positive going square wave perturbing signal on conductor 256 is applied at the input to amplifier 226 in the inverter circuit 222A and causes a decrease in the total sum error, the comparator relay 248 will energize and the same positive going signal will be applied at the input of the $X_1$ integrator 22. This positive input at the $X_1$ integrator due to polarity inversion will force the output to become more negative. The output of amplifier 225 will then become more positive and that of amplifier 226 more negative, which is the same directional effect caused at amplifier 226 by the positive perturbing signal in the first place, hence assuring that the integrator output has moved in the correct direction to minimize the total sum error. Since all other inputs to the $X_1$ integrator 22 are disconnected during a combination search run, $X_1$ being in individual channel HOLD mode, the integrator will hold its final value of $X_1$ every time the comparator relay 228 deenergizes, e.g. the total sum error starts to increase, thus moving closer and closer to the minimum total sum error with each positive going square wave pulse in the present example. The scanner switch 252 then moves to the $X_2$ integrator input and a similar sequence of events occurs. All five factors will thus change successively in a direction to minimize total sum error and thus arrive, if possible to attain, at the specified combination of response values. If the specified combination cannot be attained, the closest approach in the sense of minimizing total sum error will be attained. If readout of response errors at this pint indicate too low a value for one response, the weighting factor for this response can be increased at the increase potentiometer 237 and a better balance of response values rapidly attained.

The square wave generator 254 will provide a frequency in the range between 1/10 Hz. and 1 kHz. By adjusting the scanner rate to a switching frequency 1/10 of that of the square wave frequency, the combination search will proceed rapidly and reliably. The polarity separator of the circuit 258 provides +5-volt and −5-volt step functions for logic circuit inputs if it is desired to use a solid-state rather than a mechanical scanner.

An additional use of the combination search circuit 220 is in drawing equal response contour plots in two dimensions. Thus with a desired set value for $Y_A$ and the scanner switch 252 fixed at $X_2$, one may manually vary $X_1$ and this circuit 220 will automatically adjust $X_2$ to keep $Y_A$ constant at the set value. If $X_1$ and $X_2$ are axes on an XY plotter, the curve drawn out by the plotter pen will then be an equal response contour for the set value of $Y_A$. Automatic pen lift circuits could be actuated by comparing the total sum error output with an arbitrarily low comparison voltage to facilitate plotting ellipses, etc.

The square wave generator 254 is a repetitive disturbing signal. This may be a sine wave or a sawtooth wave, for example, but in the preferred embodiment is a signal from a square wave generator which appears on the conductor 256 and is passed through one pole of the scanner switch 252 as perturbing signal inputs to the second of the two cascaded inverters 225 and 226. A feed back means includes the same square wave signal passed through conductors 250 and 251 whenever the comparator relay contacts 248A are closed. This feedback means passes through the first pole of the scanner switch 252 to inputs of the respective integrators. With respect to the $X_1$ integrator 22 this integrator, as are the others, is an inverting amplifier; namely, a negative voltage produces a positive going signal. Accordingly the feedback means applies a feedback voltage to the respective integrator in a direction which is the same as the instantaneous perturbing signal on the second of the cascaded inverters. Accordingly this input to the inverter is in the same direction to decrease the total sum error.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An analog computer comprising, in combination, a voltage source, function generator means including an operational amplifier and connected to said voltage source, capacitive feedback means connected from the output to the input of said operational amplifier to cause same to act as an integrator to generate a linearly increasing first output voltage, means to establish a variable voltage at a terminal of said voltage source, an input resistor between said variable voltage terminal and said operational amplifier input whereby the voltage at said variable voltage terminal establishes a predetermined ramp rate for the first output voltage, means for multiplying said first output voltage of said function generator means by a first predetermined value to produce a second output voltage proportional to the product of said first output voltage and said first value, summing amplifier means, means connecting said second output voltage to said summing amplifier means to establish an amplified output, and switch means on the input of said operational amplifier to open the input circuit to said amplifier to establish a hold condition holding the variable first output voltage at the value established at the instant of opening said switch means.

2. An analog computer comprising, in combination, a voltage source, function generator means including an operation amplifier and connected to said voltage source, capacitive feedback means connected from the output to the input of said operational amplifier to cause same to act as an integrator to generate a linearly increasing first output voltage, means to establish a variable voltage at a terminal of said voltage source, an input resistor between said variable voltage terminal and said operational amplifier input whereby the voltage at said variable voltage terminal establishes a predetermined ramp rate for the first output voltage, means for multiplying said first output voltage of said function generator means by a first predetermined value to produce a second output voltage proportional to the product of said first output voltage and said first value, summing amplifier means, means connecting said second output voltage to said summing amplifier means to establish an amplified output, a comparator relay having contacts and having a first input connected to the output of said function generator means, a ramp limit potentiometer having a variable tap connected to a second input of said comparator relay to actuate said comparator relay contacts upon the first output voltage of said function generator means reaching the value of the voltage on said ramp limit potentiometer, and means connecting said relay contacts of said comparator relay in the feedback circuit of said operational amplifier to reset the output of said operational amplifier to the initial condition upon actuation of said comparator relay.

3. An analog computer comprising, in combination, a voltage source, function generator means including an operational amplifier and connected to said voltage source, capacitive feedback means connected from the output to the input of said operational amplifier to cause same to act as an integrator to generate a linearly increasing first output voltage, means for multiplying said first output voltage of said function generator means by a first predetermined value to produce a second output voltage proportional to the product of said first output voltage and said first value, summing amplifier means, means connecting said second output voltage to said summing amplifier means to establish an amplified output, a plurality of $n$ function generators in said function generator means, $n$ summing amplifiers in said summing amplifier means, $n$ pairs of a high-comparator relay and a low-comparator relay connected to each of said summing amplifiers, each of said comparator relays having first and second inputs, a high-limit potentiometer connected to said second input of each said high-comparator relay and a low-limit potentiometer connected to said second input of each said low-comparator relay, means connecting said first inputs of said pairs of comparator relays to the outputs of said summing amplifiers, respectively, normally open contacts on each said low-limit comparator relay and normally closed contacts on each said high-limit comparator relay with relay contacts of each pair connected in series with a voltage source ans an indicator lamp to have said indicator lamp energized when said output from said respective amplifier is within the range of the high and low limits.

4. An analog computer as set forth in claim 3, including a logic circuit connected to said comparator relays to indicate the existence of a plurality of summing amplifier outputs being simultaneously within the range between high and low limits.

5. An analog computer as set forth in claim 4, including a hold relay having contacts, means connecting said hold relay contacts to control the output voltage of said function generator means, and means to energize said hold relay in accordance with the output of said logic circuit.

6. An analog computer as set forth in claim 5, including a sequential printout device connected to sequentially print out the voltages on each of said function generators upon said hold relay becoming energized.

7. An analog computer comprising, in combination, a voltage source, function generator means connected to said voltage source to establish a first output voltage variable at a predetermined rate, means for multiplying said first output voltage of said function generator means by a first predetermined value to produce a second output voltage proportional to the product of said first output voltage and said first value, summing amplifier means, means connecting said second output voltage to said summing amplifier means to establish an amplified output, an operational amplifier, a potentiometer connected to said voltage source and having a variable tap, and switch means connecting said variable tap and a terminal of said voltage source across the input and output of said operational amplifier to clamp the output voltage of said operational amplifier to said voltage of said variable tap for a manual condition of operation of said function generator means.

8. An analog computer comprising, in combination, a voltage source, function generator means connector to said voltage source to establish a first output voltage variable at a predetermined rate, means for multiplying said first output voltage of said function generator means by a first predetermined value to produce a second output voltage proportional to the product of said first output voltage and said first value, summing amplifier means, means connecting said second output voltage to said summing amplifier means to establish an amplified output, comparator relay means having first and second inputs, and means connecting one of said inputs of said comparator relay means to said summing amplifier means to determine when the output of said summing amplifier means is within a given range between high and low limits.

9. An analog computer as set forth in claim 8, including means to establish a high limit,
means to establish a low limit,
and means to connect said high and how limit means to said comparator relay means.

10. An analog computer as set forth in claim 9, including contacts on said comparator relay means to be closed upon the condition of said summing amplifier output being between said high and low limits.

11. An analog computer comprising, in combination,
a voltage source,
function generator means connected to said voltage source to establish a first output voltage variable at a predetermined rate,
means for multiplying said first output voltage of said function generator means by a first predetermined value to produce a second output voltage proportional to the product of said first output voltage and said first value,
summing amplifier means,
means connecting said second output voltage to said summing amplifier means to establish an amplified output,
three function generators in said function generator means,
three summing amplifiers in said summing amplifier means,
three pairs of a high-comparator relay and a low-comparator relay with a pair connected to each of said summing amplifiers as three channels,
each of said comparator relays having first and second inputs,
a high-limit potentiometer connected to said second input of each said high-comparator relay and a low-limit potentiometer connected to said second input of each said low-comparator relay,
means connecting said first inputs of said pairs of comparator relays to the outputs of said summing amplifiers, respectively,
normally open contacts on each said low-limit comparator relay and normally closed contacts on each said high-limit comparator relay with relay contacts of each pair connected in series with a voltage source and an indicator lamp to have said indicator lamp energized when said output from said respective amplifier is within the range of the high and low limits,
a logic circuit including diode means establishing an AND channel to indicate the existence of three channels being simultaneously within the range between high and low limits,
a hold relay having contacts connected to the input of said function generator means,
means to energize said hold relay to open the input to said function generator means upon said logic circuit signalling the condition of said three channels being simultaneously within limits,
and a sequential printout device connected to sequentially print out the voltage on each of said function generators upon said hold relay becoming energized.

12. An analog computer comprising, in combination,
a voltage source,
function generator means connected to said voltage source to establish a first output voltage variable at a predetermined rate,
means for multiplying said first output voltage of said function generator means by a first predetermined value to produce a second output voltage proportional to the product of said first output voltage and said first value,
summing amplifier means,
means connecting said second output voltage to said summing amplifier means to establish an amplified output,
means to generate a perturbing signal,
means to apply said perturbing signal to said first output voltage of said function generator means,
comparator means,
means for connecting said comparator means to the output of said summing amplifier means to have an output distinguishing between increasing and decreasing outputs of said summing amplifier means,
and feedback means responsive to the decreasing output condition of said summing amplifier means to influence the input to said function generator means.

13. An analog computer as set forth in claim 12, wherein said feedback means influences said function generator means in a direction to decrease the output from said summing amplifier means.

14. An analog computer as set forth in claim 12, wherein said perturbing signal is a square wave.

15. An analog computer as set forth in claim 12, including an absolute value circuit to establish the absolute value of said second output voltage prior to summing in said summing amplifier means.

16. An analog computer as set forth in claim 12, including differentiator means connected between the output of said summing amplifier means and said comparator means to have an output which is positive or negative depending upon whether the input to the differentiator is increasing or decreasing.

17. An analog computer as set forth in claim 16, wherein said comparator means includes a comparator relay having contacts which are closed whenever the derivative voltage is negative.

18. An analog computer as set forth in claim 12, including an error detection circuit connected to receive said second output voltage.

19. An analog computer as set forth in claim 18, wherein said error detection circuit has adjustment means to adjust the input to said summing amplifier means at a predetermined value for calibration purposes,
and means to apply said second output voltage to said error detection circuit to determine the magnitude of the error between the specified and the actual value of said second output voltage.

20. An analog computer as set forth in claim 19, including an absolute value circuit to establish the absolute value of said second output voltage.

21. An analog computer as set forth in claim 12, including first and second unity gain inverters connected in cascade and having an input from said function generator means,
and means to apply said perturbing signal to the input of said second inverter.

22. An analog computer as set forth in claim 21, wherein said feedback means applies a voltage to the input to said function generator means to change the first output voltage in the same direction as the instantaneous change caused by said perturbing signal.

23. An analog computer comprising, in combination,
a voltage source,
function generator means including an operational amplifier and connected to said voltage source,
capacitive feedback means connected from the output to the input of said operational amplifier to cause same to act as an integrator to generate a linearly increasing first output voltage,
means to establish a variable voltage at a terminal of said voltage source,
an input resistor between said variable voltage terminal and said operational amplifier input whereby the voltage at said variable voltage terminal establishes a predetermined ramp rate for the first output voltage,
means for multiplying said first output voltage of said function generator means by a first predetermined value to produce a second output voltage proportional to the product of said first output voltage and said first value,
summing amplifier means, means connecting said second output voltage to said summing amplifier means to establish an amplified output, a plurality of function generators in said function generator means, a plurality of inverter circuits each having first and second unity gain inverters connected in cascade and each connected to the input of one of the plurality of function generators, said plurality of inverter circuits having outputs through said multiplying means to a plurality of error detection circuits, each of said error detection circuits including an error detection amplifier and an absolute value circuit, each of said absolute value circuits including a pair of first ans second unity gain amplifiers connected in cascade to establish on the output of said second amplifier a voltage e proportional to a weighting factor times the absolute value of the second output voltage error from its desired value, said summing amplifier means summing the error signals from said plurality of error detection circuits, a differentiator having an input connected to said summing amplifier means to have an output which is positive or negative depending upon whether the total sum error is increasing or decreasing, a comparator relay connected to the output of said differentiator to be energized whenever the total error is decreasing and hence the derivative voltage is negative, a scanner switch having a first pole and a second pole, a perturbing signal square wave generator having first and second outputs, means connecting said square wave generator first output through said scanner switch second pole successively to said second cascaded inverter in each of said inverter circuits as a perturbing signal, and feedback means connecting said square wave signal through said comparator relay contacts and said scanner switch first pole to the inputs of said integrators to change the value of the respective integrator output in a direction to decrease the total sum error.

* * * * *